Figure 1:
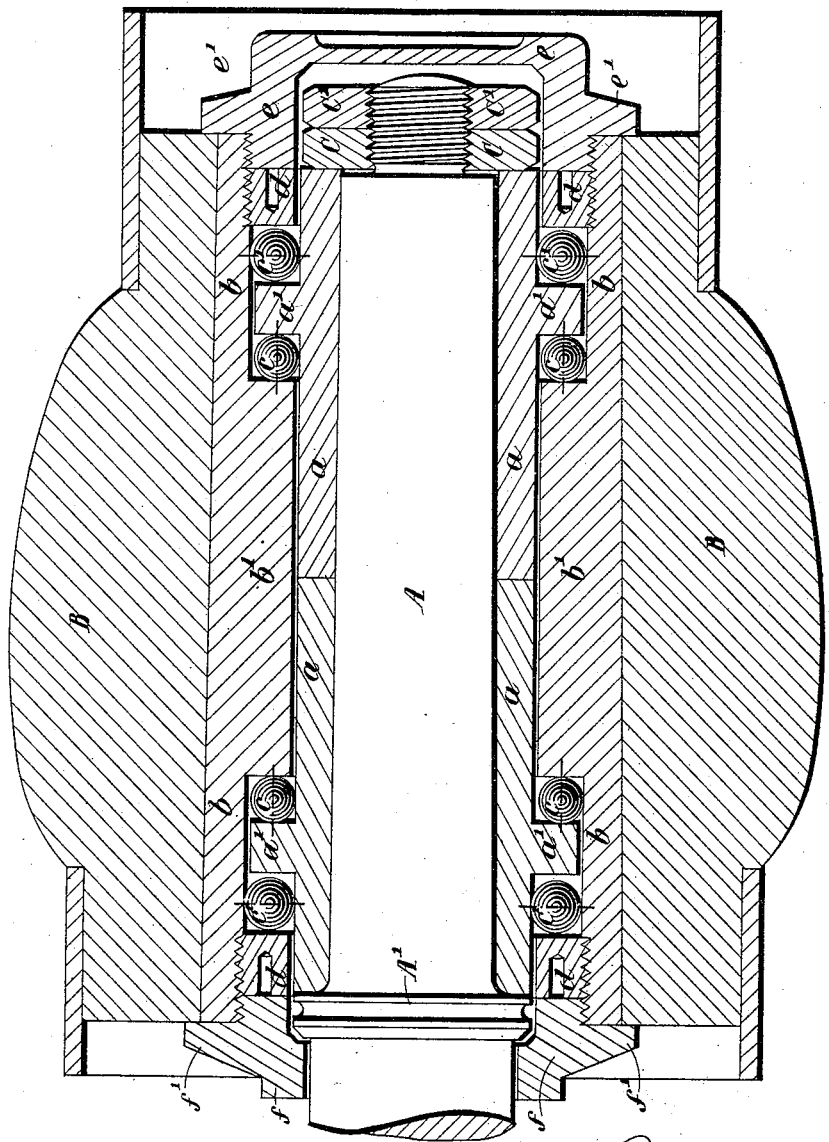

(No Model.) 4 Sheets—Sheet 1.

G. F. SIMONDS.
BALL BEARING.

No. 434,484. Patented Aug. 19, 1890.

Witnesses
J. A. Rutherford.
Geo. W. Rea.

Inventor:
George F. Simonds
By James L. Norris.
Attorney.

THE NORRIS PETERS CO., PHOTO-LITHO., WASHINGTON, D. C.

(No Model.) 4 Sheets—Sheet 3.

G. F. SIMONDS.
BALL BEARING.

No. 434,484. Patented Aug. 19, 1890.

Witnesses:
J. A. Rutherford
Geo. H. Rea

Inventor:
George F. Simonds
By James L. Norris
Attorney (No Model.) 4 Sheets—Sheet 4.

G. F. SIMONDS.
BALL BEARING.

No. 434,484. Patented Aug. 19, 1890.

Witnesses:
J. A. Rutherford
Geo. W. Rea

Inventor:
George F. Simonds.
By James L. Norris.
Attorney

UNITED STATES PATENT OFFICE.

GEORGE FREDERICK SIMONDS, OF FITCHBURG, MASSACHUSETTS.

BALL-BEARING.

SPECIFICATION forming part of Letters Patent No. 434,484, dated August 19, 1890.

Application filed May 24, 1890. Serial No. 353,087. (No model.)

*To all whom it may concern:*

Be it known that I, GEORGE FREDERICK SIMONDS, engineer, a citizen of the United States, and a resident of Fitchburg, Massachusetts, have invented certain new and useful Improvements in Ball-Bearings, of which the following is a specification, reference being had to the accompanying drawings.

My invention relates to bearings in which spherical rollers or balls are employed to diminish the friction.

My said invention relates more particularly to bearings of the kind or class wherein some of the balls bear against and roll upon concentric surfaces for the purpose of supporting or resisting radial pressure, while the remainder of the said balls bear against and roll upon plane surfaces for the purpose of supporting or resisting thrust or end pressure.

My said invention comprises the combination of tubes or sleeves provided with circumferential projections, ribs, or collars, another tube or sleeve concentric with the said tubes or sleeves, and having a circumferential projection, rib, or collar, which extends into the space between the ribs or collars on the said tubes or sleeves, balls arranged to bear against and roll upon parallel plane surfaces on the said ribs or collars, and balls arranged to bear against and roll upon concentric surfaces on the inner and outer tubes or sleeves.

My said invention also comprises the combination, with the inner and outer tubes or sleeves, of a cap or cover for closing one end of the bearing, and a ring or annular piece secured in the other end of the bearing. This cap or cover and ring or annular piece are preferably screw-threaded and secured in the outer tube or sleeve. The said cap or cover effectually closes one end of the bearing, while the ring or annular piece assists in closing or partially closing the other end thereof, so as to exclude dust and water.

My said invention further comprises the combination, with the inner and outer tubes or sleeves, and the said cap or cover and ring or annular piece, of other rings or annular pieces screwed or otherwise secured in the annular space between the said tubes or sleeves, so that they will serve for retaining the balls therein, and in some cases, also, for bringing the balls to a bearing against the plane surfaces of the ribs or collars.

In the accompanying drawings, I have shown how my said invention may be conveniently and advantageously carried into practice.

Figures 1, 2, 3, and 4 are longitudinal central sections illustrating various forms or modifications of my improved ball-bearing.

A is a shaft or axle, which is provided with a collar A'.

B is the nave or hub of a wheel.

$a\ a$ are tubes or sleeves which are secured upon the said shaft or axle by means of nuts $C\ C'$, or in any other convenient manner, and each of which is provided with an external circumferential projection, rib, or collar $a'$.

$b$ is an outer sleeve or box surrounding and concentric with the said tubes or sleeves $a$. This outer sleeve or box is provided with an internal circumferential projection, rib, or collar $b'$, which extends into the space between the ribs or collars $a'$ on the tubes or sleeves $a$.

$c\ c'$ are the balls which are arranged in annular spaces or channels between the inner and outer tubes or sleeves $a\ b$.

In the bearing shown in Fig. 1 screw-threaded rings $d$ are fitted in the ends of the outer sleeve or box $b$ for the purpose of retaining the balls in place and securing the parts of the bearing together. A screw cap or cover $e$ is also secured in the outer end of the sleeve or box $b$, so that it completely closes this end of the bearing, thus preventing the entrance of dust or water into the same. A screw-threaded ring or annular piece $f$ is moreover secured in the other end of the sleeve or box $b$, this ring being split or divided to enable it to be conveniently applied to and removed from the shaft or axle A. This ring $f$ serves to prevent the entrance of dust or water into the bearing, and also to retain therein a considerable quantity of oil or other lubricant, if such is found necessary in any case. The balls $c$ for resisting thrust or end pressure are arranged between the rib $b'$ and the ribs or collars $a'$. The balls $c'$ for supporting the shaft or axle are arranged between the ribs or collars $a'$ and the screw-threaded rings $d$.

Figure 2:
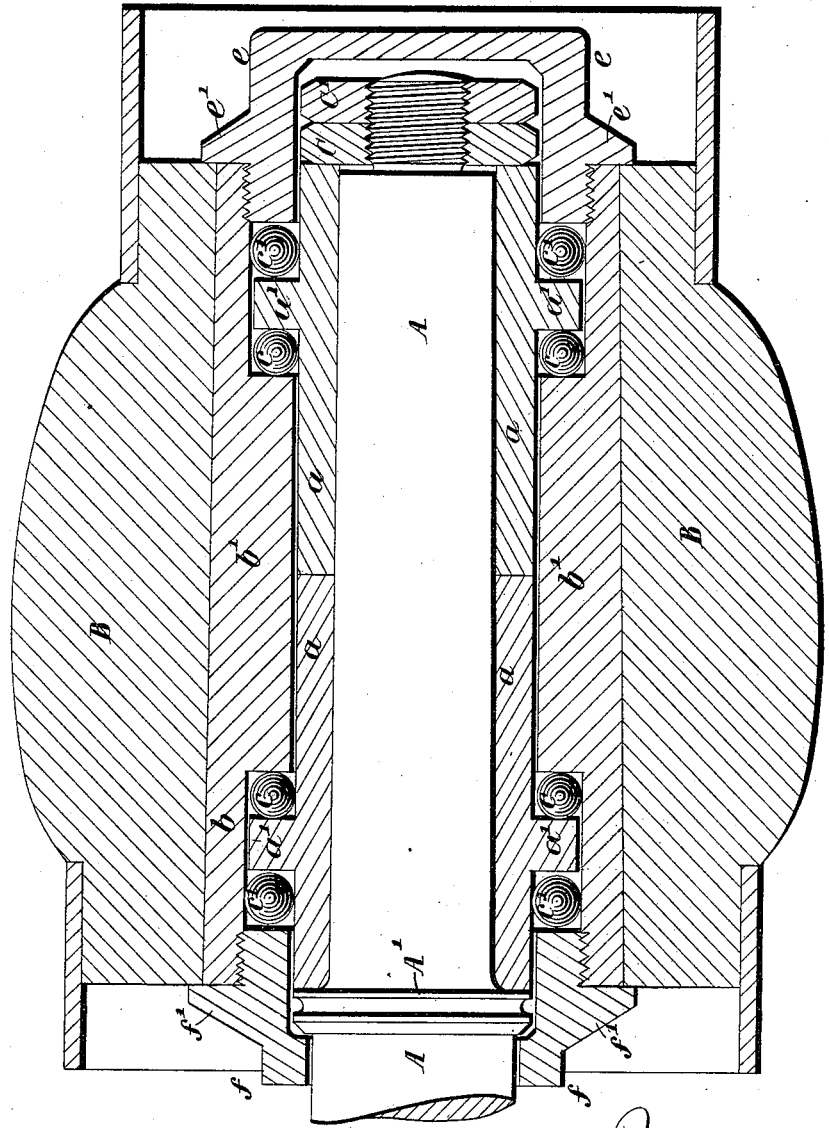

I sometimes dispense with the separate rings $d$ and construct my improved bearing as shown in Fig. 2, the balls $c'$ being arranged between the ribs or collars $a'$ and the adjacent surfaces of the cap or cover $e$ and ring $f$, respectively. I find it advantageous to make the cap or cover $e$ and the ring $f$ with flanges $e'$ $f'$, of such diameter that they extend beyond the periphery of the sleeve or box $b$ and cover the joint between the latter and the nave or hub of the wheel, as shown, and also assist in retaining the bearing in place in the said nave or hub.

If desired, I provide in the cap or cover $e$ a suitable oil-hole, which may be closed by a screw-plug or otherwise to prevent the entrance of dust through the same. Oil can be poured into the bearing through this hole until the oil rises to the level of the interior surface of the lower part of the ring $f$. I sometimes make the said ring $f$ as shown in Figs. 1 and 2, so that it extends inward beyond the channels in which the balls are located—that is to say, so that its internal diameter is less than that of the said channels. I thus provide for more effectually excluding dust and adapt the bearing. For instance, if it is desired to provide for a slight longitudinal play of the outer sleeve or box $b$, I can shorten somewhat the projection, rib, or collar $b'$ on said sleeve, to hold a larger quantity of oil. This quantity of oil will be sufficient to last for a very considerable time, being effectually retained in the bearing by the said ring $f$. My improved bearing will, however, not be liable to heat when run without oil or other lubricant, as the balls roll upon but do not rub against the bearing-surfaces.

Figure 3:
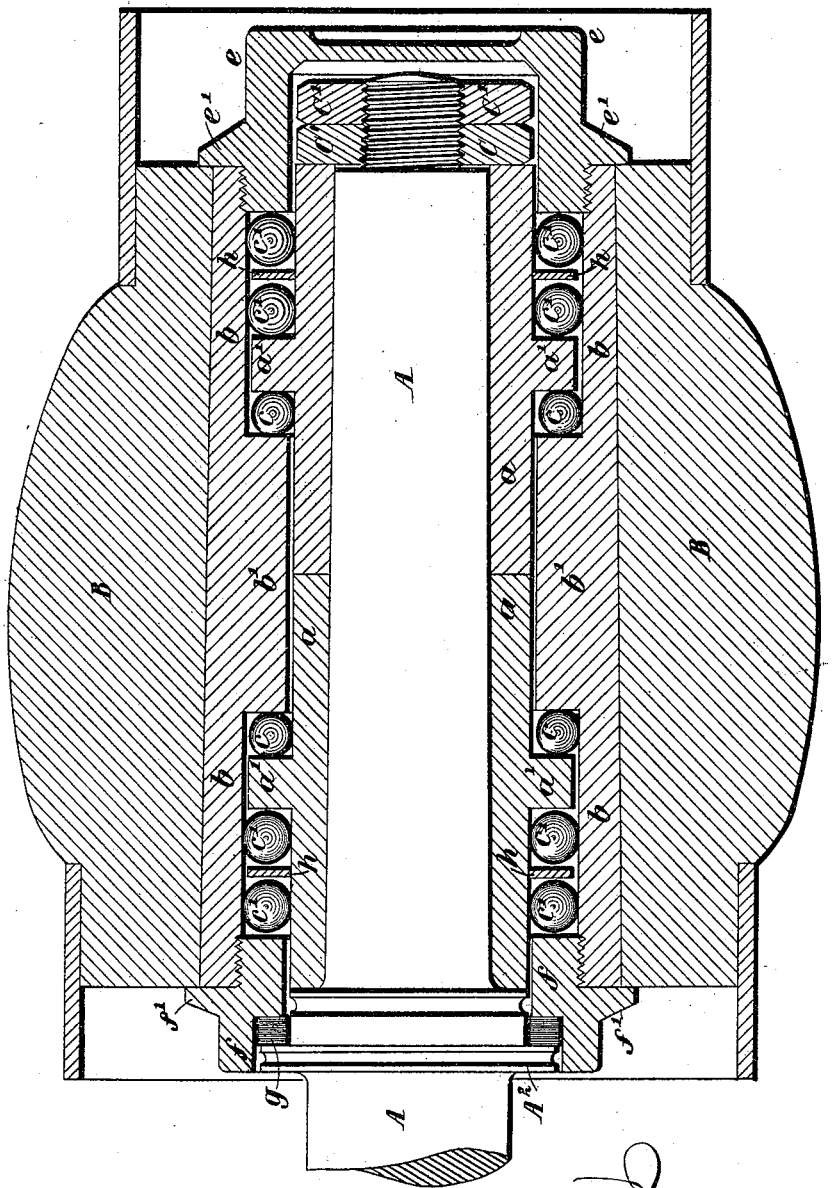

In the form or modification of my improved bearing shown in Fig. 3, I make the shaft or axle $A$ with a collar $A^2$, and I arrange between this collar and a complete or undivided ring or annular piece $f$, screwed into the corresponding end of the bearing, a ring or washer $g$, of leather or other suitable material, so that when the wheel is secured upon the axle the bearing will be completely closed, thus preventing the entrance of any dust or water into the same. It will be seen that in this modification the rings $d$ are dispensed with. In this case by removing the cap $e$ and taking off the nuts $C$ $C'$ and then replacing the said cap the wheel can be detached from the axle without displacing any of the balls.

Figure 4:
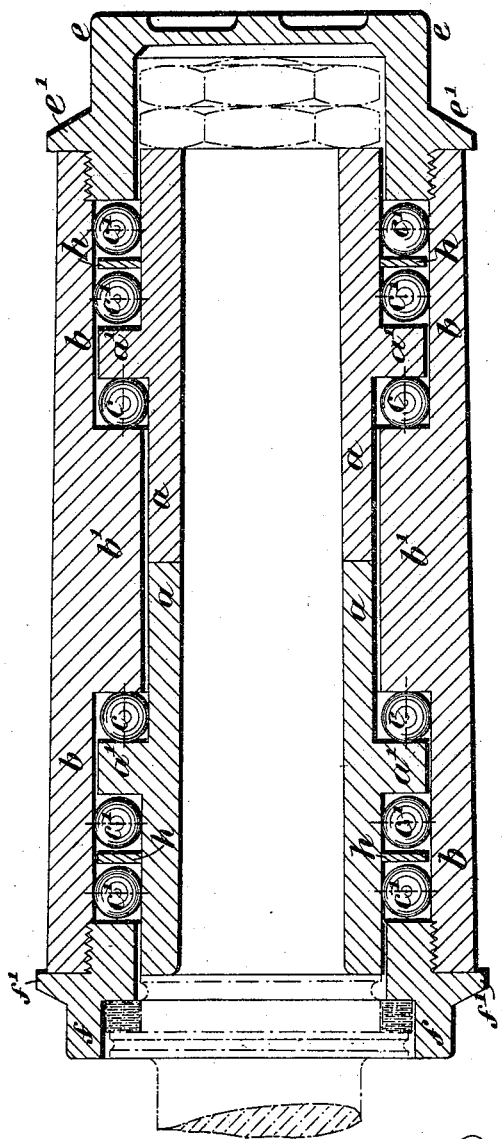

In Fig. 3 I have shown two circular series or groups of balls $c'$ at each end of the bearing, the balls of one group being separated from those of the other group by rings $h$. It is obvious, however, that I can use any other desired number of series or groups of balls for supporting radial pressure. The balls $c'$, which sustain the radial pressure, are sometimes made of somewhat larger diameter than the balls $c$, which sustain the thrust or end pressure, as shown in Figs. 1, 2, and 3. In some instances, however, I make all the balls of equal diameter, as shown in Fig. 4, the parts of the tubes or sleeves $a$ between the ribs or collars $a'$ being reduced in diameter so as to leave sufficient clearance between the balls $c$ and the concentric surfaces of the inner and outer tubes or sleeves $a$ $b$. The balls $c'$ for supporting radial pressure are situated outside of the balls $c$ for resisting thrust or end pressure, thus providing for the more effective resistance to rocking of the wheel on the shaft or axle.

My improved bearing constructed with the outer sleeve or box within which the balls and other parts are arranged, and in the ends of which are secured the devices above described whereby the parts are held together, forms a complete device ready for application to a shaft, axle, wheel, or other body in or upon which it is to be used, as more clearly shown in Fig. 4.

It is obvious that I can, if desired, reverse the arrangement of the balls in the bearing shown in Fig. 1 or in Fig. 2—that is to say, I can arrange the balls $c'$ so that they bear against and roll upon plane surfaces on the ribs or collars $a'$, and on the rings $d$ or on the cap or cover $e$ and ring $f$, the balls $c$, between the rib or collar $b'$ and the ribs or collars $a'$, being arranged to bear against and roll upon the concentric surfaces of the tubes or sleeves. In this case the rings $d$, when such are employed, as in Fig. 1, can be adjusted to bring the balls $c$ to a bearing against the corresponding plane surfaces or to compensate for wear. It is evident, moreover, that I can somewhat further modify the construction of my improved bearing according to the purpose for which it is required without departing from the nature of my said invention.

Certain features of construction shown and described, but not claimed in this application, are shown, described, and claimed in other applications that have been filed by me, Serial Nos. 331,639, 336,403, and 352,378.

What I claim is—

1. A ball-bearing comprising two tubes or sleeves, each of which has a circumferential projection, rib, or collar, another tube or sleeve concentric with the said tubes or sleeves and having a circumferential projection, rib, or collar which extends into the space or recess between the ribs or collars of the said tubes or sleeves, balls for resisting thrust or end pressure located between the inner and outer tubes or sleeves, and balls for resisting or supporting radial pressure also located between the said inner and outer tubes or sleeves, for the purposes above specified.

2. In a ball-bearing, the combination of two inner tubes or sleeves each having an external circumferential projection, rib, or collar provided with a plane bearing-surface, an outer tube, sleeve, or box concentric with the inner tubes or sleeves and having an internal circumferential projection, rib, or collar which extends into the space or recess between the ribs or collars of the said inner tubes or sleeves, and which is provided with plane bearing-surfaces parallel to those of the said ribs or collars, balls for resisting thrust or end pressure located between the said bearing-surfaces, and balls for resisting or supporting radial pressure located between concentric bearing-surfaces on the inner and outer tubes or sleeves, substantially as and for the purposes set forth.

3. In a ball-bearing, the combination of an outer tube, sleeve, or box, inner tubes or sleeves concentric with the said outer sleeve or box, a cap or cover for closing one end and a ring or annular piece secured in the other end of the bearing, and balls arranged between the said inner and outer tubes or sleeves, some of the said balls being arranged to resist or support radial pressure and the remainder of the said balls being arranged to resist thrust or end pressure, substantially as and for the purposes set forth.

4. In a ball-bearing, the combination of two tubes or sleeves, each of which has a circumferential projection, rib, or collar, another tube or sleeve concentric with the said tubes or sleeves and having a circumferential projection, rib, or collar which extends into the space or recess between the ribs or collars of the said tubes or sleeves, balls for resisting thrust or end pressure located between the said ribs or collars, balls located between and bearing against concentric surfaces on the inner and outer tubes or sleeves, a cap or cover closing one end of the bearing, and a ring or annular piece secured in the other end thereof, substantially as and for the purposes set forth.

5. In a ball-bearing, the combination of an outer tube, sleeve, or box, inner tubes or sleeves concentric therewith, balls for resisting or supporting radial pressure, and balls for resisting thrust or end pressure located between the said inner and outer tubes or sleeves, a screw-threaded cap or cover secured in one end of the said outer tube or sleeve, and a screw-threaded ring or annular piece secured in the other end thereof, substantially as and for the purposes set forth.

6. In a ball-bearing, the combination of an outer tube, sleeve, or box, inner tubes or sleeves concentric therewith, balls for resisting or supporting radial pressure, and balls for resisting thrust or end pressure located between the said inner and outer tubes or sleeves, screw-threaded rings secured in the said outer tube or sleeve for retaining the balls in place, a screw-threaded cap or cover secured in one end of the said outer tube or sleeve, and a screw-threaded ring or annular piece secured in the other end thereof, substantially as and for the purposes set forth.

7. In combination with the nave or hub of a wheel, a ball-bearing comprising an outer tube, sleeve, or box fitted in the said nave or hub, inner tubes or sleeves concentric with the said outer sleeve or box, a screw-threaded cap or cover for closing one end, and a screw-threaded ring secured in the other end of the said outer sleeve or box, and balls arranged between the said inner and outer tubes or sleeves, substantially as and for the purposes set forth.

8. In combination with the nave or hub of a wheel, a ball-bearing comprising an outer tube, sleeve, or box fitted in the said nave or hub, inner tubes or sleeves concentric with the said outer sleeve or box, a screw-threaded cap or cover for closing one end, and a screw-threaded ring secured in the other end of the said outer sleeve or box, the said cap or cover and ring being made with external flanges to engage with the said nave or hub, and balls located between the said inner and outer tubes or sleeves, substantially as and for the purposes set forth.

9. The combination, with a hub or nave, and with a shaft or axle having a collar or shoulder, and fastening devices for securing the hub or nave upon it, of an outer tube, sleeve, or box fitted in the said nave or hub, inner tubes or sleeves secured upon the said shaft or axle and concentric with the said outer sleeve or box, a screw-threaded cap or cover secured in one end, and a screw-threaded ring or annular piece secured in the other end of the said outer sleeve or box, balls located between the said inner and outer tubes or sleeves, and a washer located between the said screw-threaded ring or annular piece and the collar or shoulder on the said shaft or axle, substantially as and for the purposes set forth.

10. In a ball-bearing, the combination of rings or sleeves $a$, provided with external circumferential ribs or collars $a'$, an outer sleeve or box $b$, surrounding the said rings or sleeves and provided with an internal circumferential rib or collar $b'$ extending into the space or recess between the said ribs or collars $a'$, a screw-threaded cap or cover $e$, secured in one end and a screw-threaded ring $f$, secured in the other end of the said outer sleeve or box, balls arranged between the said rib or collar $b'$ and the ribs or collars $a'$, and balls arranged between the said ribs or collars $a'$ and the screw-cap $e$ and ring $f$, respectively, substantially as and for the purposes set forth.

In testimony whereof I have hereunto signed my name in the presence of two subscribing witnesses.

GEORGE FREDERICK SIMONDS.

Witnesses:
 DAVID YOUNG,
 GEO. BARNETT.